United States Patent [19]
Jelfs

[11] Patent Number: 4,616,948
[45] Date of Patent: Oct. 14, 1986

[54] HYDRAULIC FRICTIONAL COUPLING

[76] Inventor: Stewart D. Jelfs, 3 Northwick Rd., Worchester, England

[21] Appl. No.: 690,485
[22] PCT Filed: May 2, 1984
[86] PCT No.: PCT/GB84/00148
 § 371 Date: Jan. 4, 1985
 § 102(e) Date: Jan. 4, 1985
[87] PCT Pub. No.: WO84/04367
 PCT Pub. Date: Nov. 8, 1984

[30] Foreign Application Priority Data

May 5, 1983 [GB] United Kingdom ............... 83 12373

[51] Int. Cl.⁴ ............................................. F16B 2/04
[52] U.S. Cl. .......................................... 403/5; 403/31
[58] Field of Search .................. 403/5, 15, 31; 92/28, 92/27, 24

[56] References Cited

U.S. PATENT DOCUMENTS 2,293,085 8/1942 Stieber .
3,208,759 9/1965 Firestone et al. ................... 92/24 X
3,861,815 1/1975 Landaeus ............................ 403/370
4,105,343 8/1978 Riegler et al. ..................... 403/34 X
4,425,050 1/1984 Durand ............................... 403/15

FOREIGN PATENT DOCUMENTS 950728 2/1964 United Kingdom .
1230519 5/1971 United Kingdom .
2023256 12/1979 United Kingdom .

Primary Examiner—Andrew V. Kundrat
Attorney, Agent, or Firm—Roylance, Abrams, Berdo & Goodman

[57] ABSTRACT

In the field of fastening components together in such a way as to be able to transmit mechanical power, keyways and keys have been used; also, interlocking conical tapers have been used which are actuated either by a ring of screws or by oil-injection.

The coupling according to the invention comprises an annular chamber housing an annular piston; the chamber and the piston have matching tapers. Oil is pumped into one end of the chamber to move the piston axially in one direction to cause radial expansion of the chamber to connect two components; oil is pumped into the other end of the chamber to move the piston in the opposite direction to disconnect said components.

Uses of the coupling are, for example, to join the adjacent ends of coaxial shafts and to act as a locking bush to join concentrically arranged components.

7 Claims, 5 Drawing Figures

4(a)   4(b)

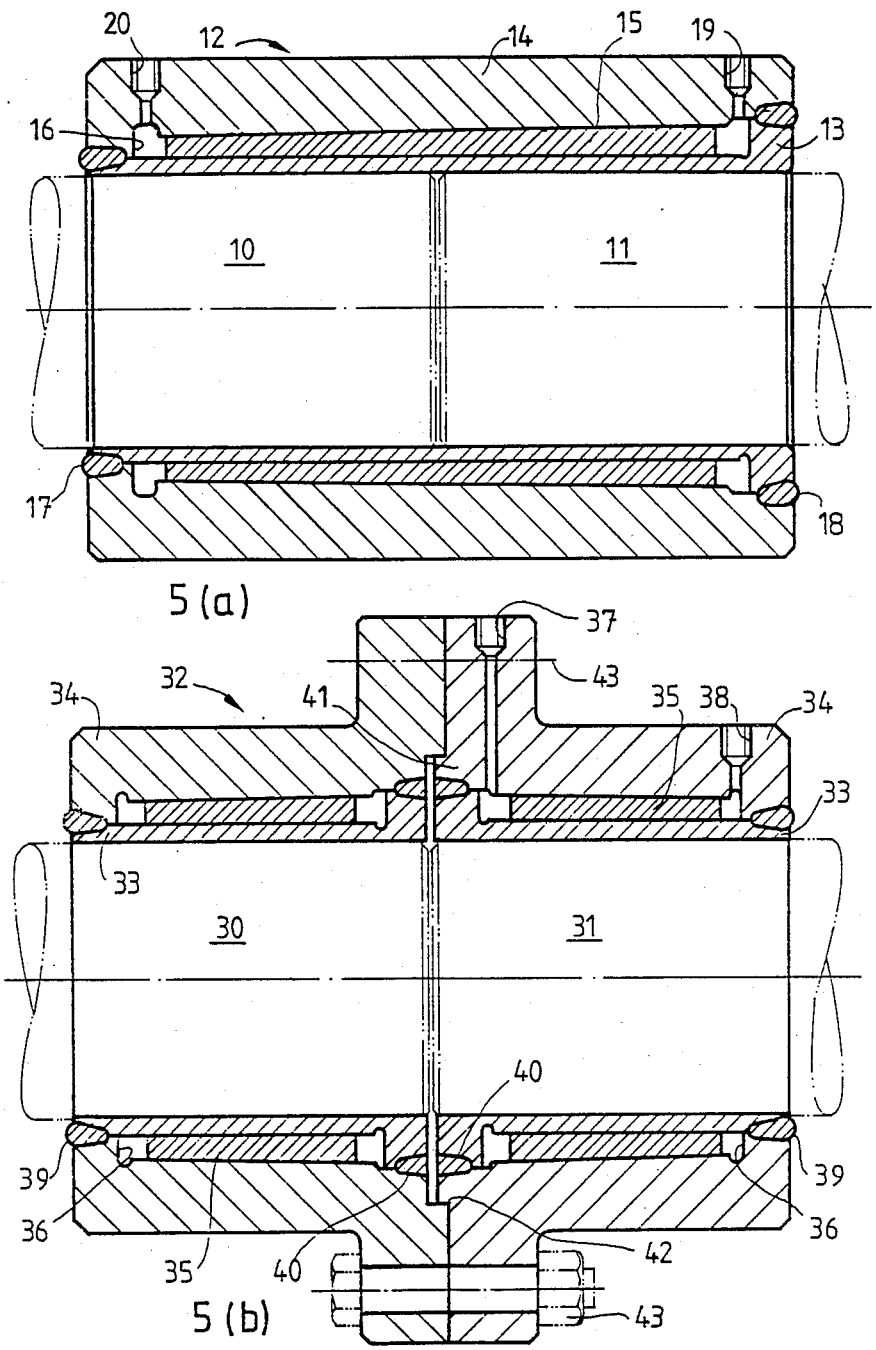

HYDRAULIC FRICTIONAL COUPLING

BACKGROUND OF THE INVENTION.

1. Field of the Invention

This invention relates to frictional locking couplings used, for example, in mechanical power transmission systems to fasten two shafts together, or to fasten two components to one another in such a manner as to resist axial thrust, or even a combination of the two.

2. Description of the Prior Art

For many years, in the field of mechanical power transmission, the use of keys and keyways has been accepted practice, although the severe stress concentration in shafts due to keyseats has long been recognized as one of the prime causes of failure due to fatigue. Furthermore, press-fitting is often employed in conjunction with a key and this accentuates the problems of mounting and dismounting whilst compounding the effect of stress concentration.

In recent years several types of devices have become available which overcome some of the problems outlined above. Most of these devices use interlocking conical tapers which are actuated by means of a ring of screws; these screws must all be tightened in a correct sequence and to a specified torque setting to ensure satisfactory torque-transmitting capacity on the part of the joined components. For small-diameter shafts and light-duty joints this may well be acceptable; however, on large heavy-duty applications the process of tightening the screws becomes extremely tedious and time-consuming. In the course of tightening a single joint it is not uncommon to apply a torque-wrench ten or twelve times to each of perhaps two dozen screws before finally achieving the condition when all are fully tight. If any one screw is found to require further tightening, then the process of tightening this one screw will also necessitate going around all the remaining screws because these will very probably have become loosened as the conical tapers move. Furthermore, the heads of the screws lie in close proximity to the surface of the shaft and this makes it difficult to apply the torque-wrench; in some instances, a special torque-wrench with truncated head is necessary to gain access to the screw heads. The time factor alone makes the fitting process very expensive for practical engineering purposes.

Another method of achieving a joint which is suitable for the transmission of mechanical power and which is readily dismountable is the oil-injection method. This entails injecting oil at very high pressure between mounted components, the oil pressure being slightly in excess of the surface pressure of the interference fit. To facilitate manufacture, the mating surfaces are usually slightly tapered. This is a very reliable method, well-proven in heavy engineering over many years. There are, however, several drawbacks. Firstly, the tapered surfaces are difficult to manufacture accurately with the necessary oil-feed and drainage ducts. Secondly, the finely tapered surfaces render it impossible to achieve accurate axial positioning of the mounted components without using an intermediate sleeve. Thirdly, special external hydraulic tooling has to be provided to supply axial thrust to the joint whilst fitting; normally, two separate hydraulic systems are used, one for radial pressurisation and the other for axial pressurisation.

SUMMARY OF THE INVENTION

This invention provides a device for hydraulic frictional locking of two components to one another which overcomes most of the aforementioned difficulties and results in a readily mountable and dismountable joint capable of transmitting high torque and/or resisting axial thrust. This is achieved, essentially, by using an annular coupling which comprises a captive axially displaceable piston. When the piston is displaced in a first axial direction, the coupling assumes a dilated condition in which frictional locking is achieved, and when the piston is displaced in a second axial direction (opposite to the first axial direction) the coupling resumes its undilated condition.

BRIEF DESCRIPTION OF THE DRAWINGS

FIGS. 5(a) and 5(b) illustrate axial sections through two shafts which are connected to one another by two different embodiments of a coupling according to the invention.

DESCRIPTION OF THE PREFERRED EMBODIMENTS

Figure 1:
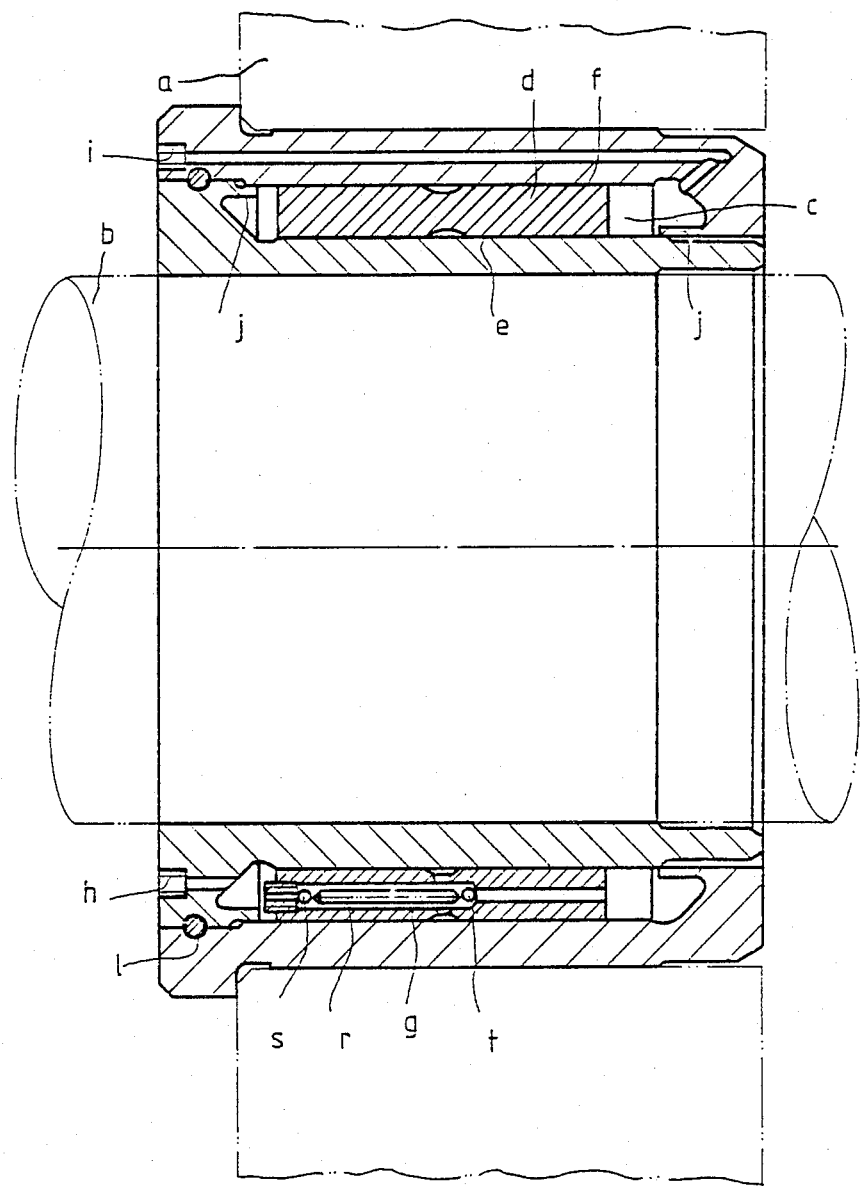
FIG. 1 is an axial section through two components joined by a bush according to a first embodiment.

Referring firstly to FIG. 1, there is illustrated therein a bush with cylindrical external surfaces which is mounted coaxially between cylindrical surfaces of the outer and inner components a, b which are to be fastened to one another. When hydraulically pressurised from an external source, the bush dilates (i.e. the outer diameter increases and the inner diameter decreases) so as to produce effectively an interference fit at both outer and inner surfaces; in order to achieve this, the hydraulic frictional locking bush has an inner annular cavity c containing an annular piston d. The piston is an accurate fit radially within the cavity and at least one of the fitting surfaces of each of the cavity and piston is conical. The piston can move axially under the influence of a pressurised hydraulic fluid which may be admitted to either end of the piston depending on whether it is desired to mount or dismount the assembled components. The taper of the conical surfaces ensures that axial movement of the piston results in radial expansion or contraction of the bush. All mating surfaces are of accurate form and are assembled with slight interference to overcome leakage, even in the relaxed condition. Alternatively, annular sealing rings such as 'O' rings, or similar, may be employed. The taper of the conical surfaces is sufficiently fine to render them self-sustaining.

In order to facilitate axial movement of the piston under the very high radial loads, the oil-injection principle (previously briefly described) is utilised to provide an oil-film between the pairs of opposed surfaces e and f, where relative movement occurs.

However, it is to be noted that a single source of high-pressure fluid (which may be, for example, a high-pressure hand pump) is used to provide both the axial and radial forces simultaneously. Oilways through the piston provide a supply of hydraulic fluid to said mating surfaces e, f regardless of the side from which the annular piston is pressurised, whilst leakage to the non-pressurised side of the piston is prevented by a simple valve arrangement g. The external source of hydraulic pressure is connected to tapping h for mounting, and to tapping i for dismounting. The annular fastener l prevents axial separation of the component parts of the bush.

The valve arrangement g comprises a rod r and two balls s, t which are adapted to seat against respective valve seats in dependence upon the end from which the cavity or chamber c is pressurised. When hydraulic pressure is applied at tapping h, ball s is moved to the right away from its seat, displacing rod r against ball t to push ball t against its valve seat. This permits the oil applied to piston d to be also conveyed radially between the contacting surfaces of the piston and encircling components, without passing to the opposite side of the piston. Conversely, when hydraulic pressure is applied through tapping i, ball t is lifted off its valve seat and rod r pushes ball s against its valve seat. Said valve arrangement g can be modified by replacing the rod r by a coiled compression spring (not illustrated) which tends to urge both balls s,t, onto their respective seats at all times, said spring force beong overcome by the pumped hydraulic fluid.

The manufacture of the hollow bush presents practical difficulties in sealing against leakage, and also in mechanical strength to resist axial loads imparted by the high hydraulic pressure. FIG. 1 shows a two-part bush which has metal-to-metal skirt-type seals j to overcome the sealing problem. It is felt that a more effective and economical method of manufacture will be to make the bush in three parts and to employ the electron beam welding process to fuse two co-axial junctions k (FIG. 2) simultaneously at each end of the bush. This method of welding will give minimal distortion and high strength.

Figure 3:
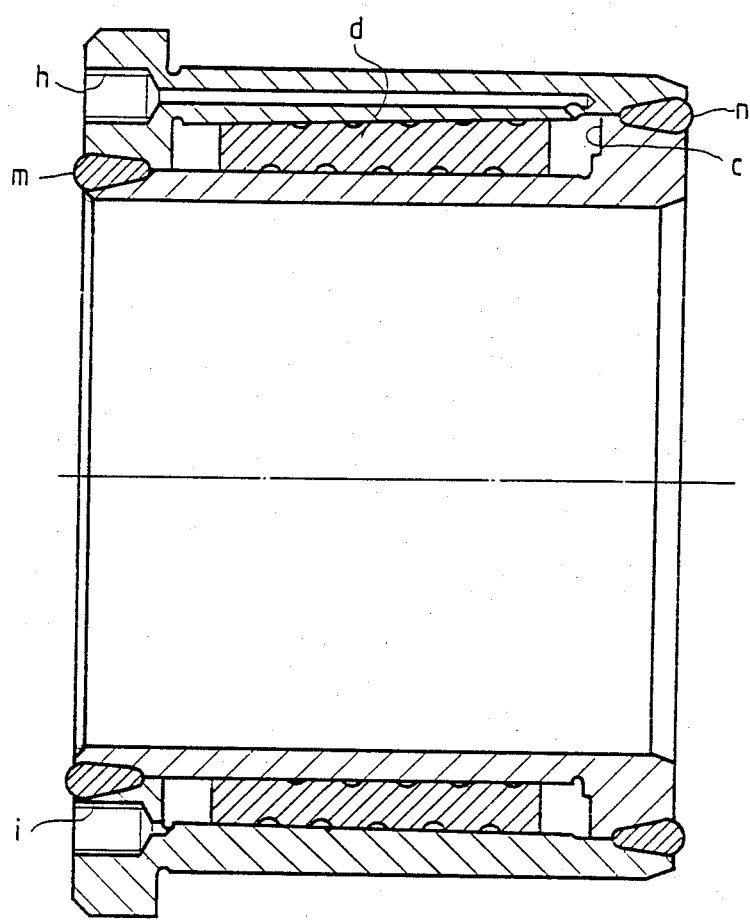
FIG. 3 is an axial section through a third embodiment of a bushing according to the invention.

FIG. 3 depicts a practical design of bush (bushing) which is made in two parts which are joined to each other by electron beam welding to form the cavity or chamber c for the piston d. The welding junctions m and n may be assembled with slight interference fit. The weld does not penetrate right through the junction and therefore the prospective problem of contamination of the cavity by weld debris is obviated. The process of electron beam welding is virtually essential to the success of this design as it gives high strength with minimal distortion.

It is also to be noted that the configuration of the bush shown in FIG. 3 yields an important advantage, namely, that the degree of interference fit achieved is easily monitored and is therefore readily controllable. Thus, during mounting, a depth gauge may be inserted through the vacant dismounting oil tapping hole i to touch the piston d. The axial drive-up distance of the piston thus measured gives a direct indication of the interference fit induced.

Figure 2:
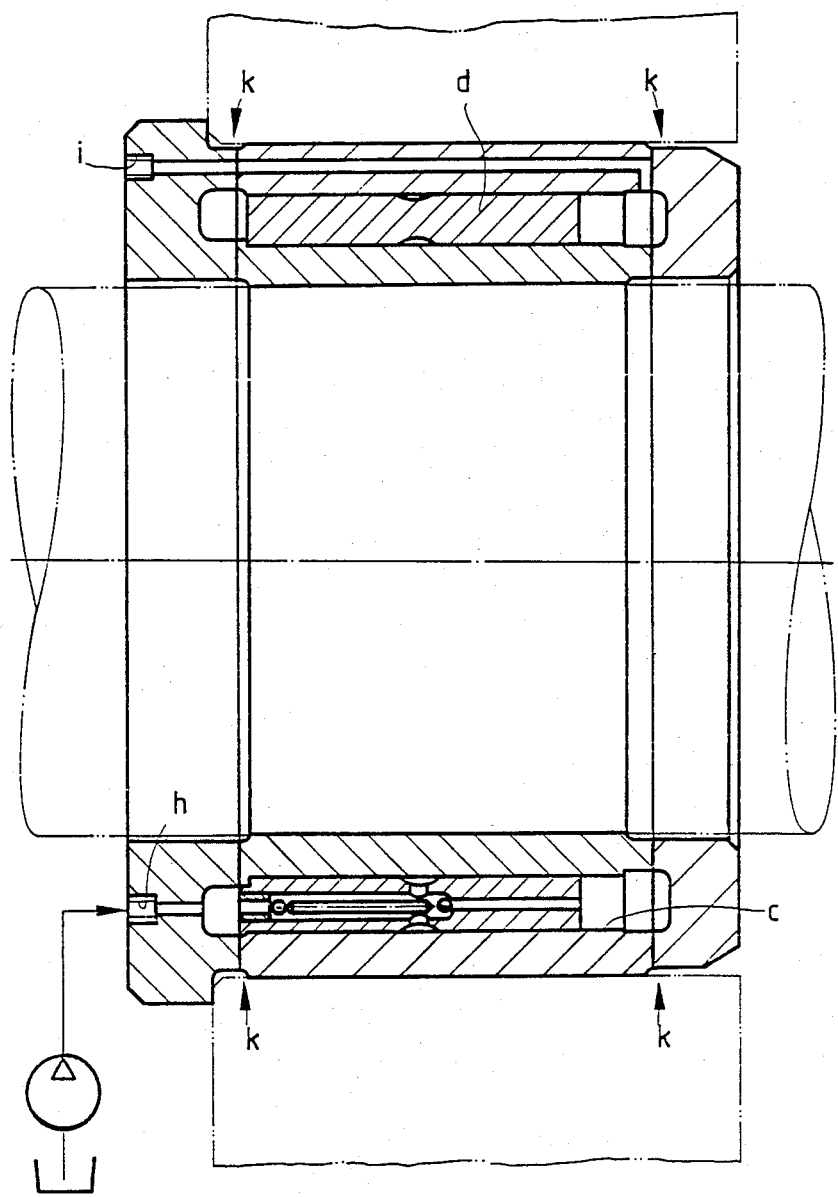
FIG. 2 is a view similar to FIG. 1 and in which an alternative embodiment of the bush is illustrated.
Figure 4:
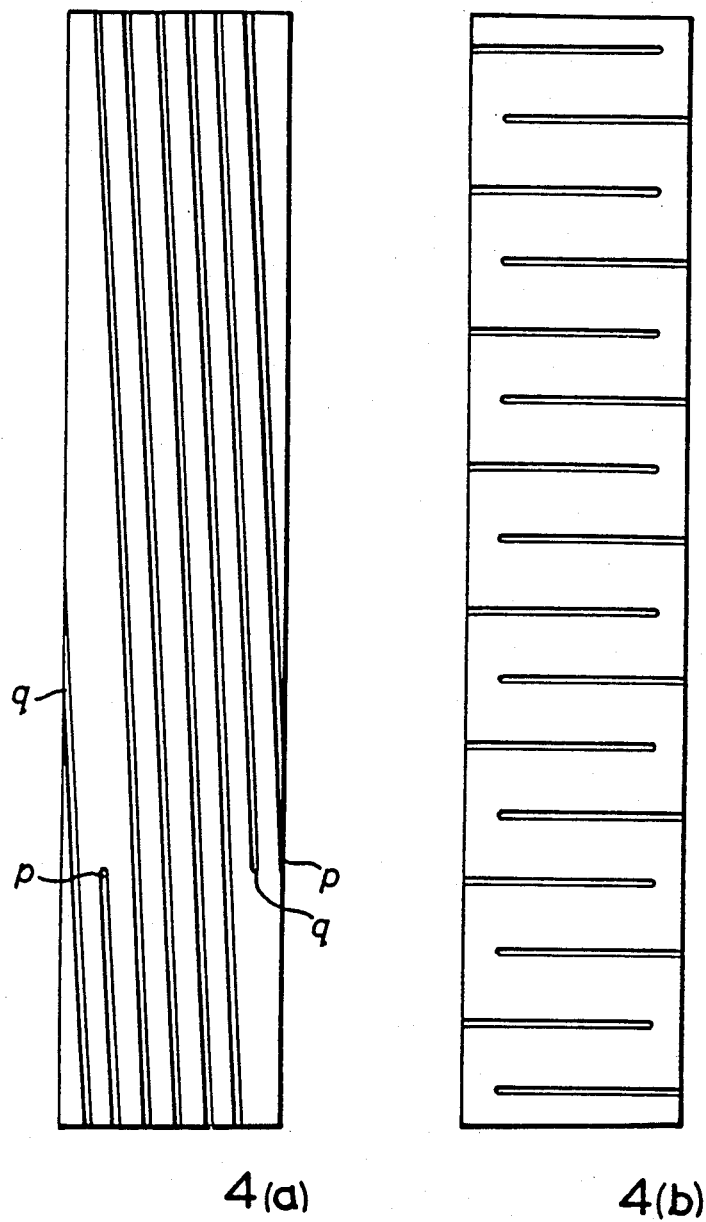
FIGS. 4(a) and 4(b) illustrate developments of the internal/external surfaces of two further embodiments of a bush or other type of coupling according to the invention.

FIG. 3 also does not include the valve arrangement g shown in FIGS. 1 and 2. Instead, a pair of non-intersecting helical grooves p and q (FIG. 4(a)) are cut on both the external and the internal sliding surfaces of the piston. At each sliding surface, one groove of the pair runs right through into (is open at) the respective end face of the piston to be fed by oil from the cavity or chamber c whilst the other end of said groove stops well short of the other end of the piston and thereby prevents leakage of the pressurized oil past the piston. The other of the two grooves is arranged in the converse manner. This arrangement gives a closed oil-feed to the sliding surfaces from each end of the piston, but without the complication of the valve arrangement g. As an alternative to the form shown in FIG. 4 (a), the helical grooves may simply be replaced by several straight axial grooves which are open at one end and closed at the other as shown in FIG. 4 (b); such axially extending grooves also give an oil-feed capability without any leakage. Thus, these helical and straight grooves convey oil from the pressurized face of piston d to between the contacting surfaces of the piston and encircling components. The flow of oil is halted at the closed end of each groove such that the flow does not extend through to the opposite face of the piston and relieve the pressure on the pressurized face.

FIGS. 5(a) and (b) show two different versions of a coupling for joining two shafts to each other, said coupling utilising the principle underlying the present invention. In FIG. 5(a), the end portions of two coaxial shafts 10, 11 are shown joined to one another by a coupling indicated generally by the reference numeral 12. The coupling 12 consists of two components 13, 14 and an annular piston 15 which is housed within an annular cavity or chamber 16; the components are joined to one another at 17, 18 by welds preferably made by the electron beam welding process. The generally axially extending internal surfaces of the chamber 16 are such as to provide a taper and the annular piston has its corresponding surfaces so formed as to provide a matching taper. A tapping 19 and an associated conduit communicate with one end of the chamber 16 and another tapping 20 and an associated conduit communicate with the other end of said chamber, the tappings 19, 20 are respectively the mounting and dismounting tappings. The component 14 has had its radial thickness increased considerably when compared with the thicknesses of the corresponding parts in FIGS. 1 to 3; this has been done in order to ensure that the unit as a whole will be able to restrain or absorb the hoop stresses which result from the application of hydraulic pressure by the pump. Further description of this embodiment is not considered to be necessary.

In FIG. 5(b), the end portions of two coaxial shafts 30, 31 are shown joined to one another by a two-part coupling which is indicated generally by the reference numeral 32. It will be seen that each part of the coupling 32 consists of two components 33, 34 and an annular piston 35 which is housed within an annular chamber 36; the chamber and the piston taper as already described with reference to FIG. 5(a). There are also tappings/conduits 37, 38 for mounting and dismounting, respectively, and welds 39, 40 as already described with reference to FIG. 5(a). It should be noted that, although only the right-hand part of the coupling 32 is illustrated with its tappings/conduits 37,38, the left-hand part is also equipped therewith and that these have not been shown for the reason that they are not in the same section plane as the ones which have been illustrated.

The right-hand part of the coupling 32 is provided with an axially projecting boss or spigot 41 which (in the assembled condition illustrated) extends into a corresponding re-entrant recess 42, thereby providing a centering and interlocking feature. The two parts of the coupling 32 are bolted together as indicated by the reference numerals 43. Further description of this embodiment is also considered to be unnecessary.

The embodiment of FIG. 5(a) is suitable in locations in which, when for repair or for maintenance or for some other reason, the separation of the two shaft portions 10, 11 becomes necessary. In such a case, the coupling 12 is dismounted by appropriate operation as hereinbefore described and the slackened coupling is moved to the right or to the left so as to clear the respective shaft end portion. In cases where there is little or no room in one direction or the other for such axial sliding of the coupling along the components, the embodiment of FIG. 5(b) is suitable because one need only undo and remove the bolts/nuts 43 in order to be able to separate the halves of the coupling 32 axially just far enough to disengage the boss 41/recess 42; the FIG. 5(b) embodiment would be very useful, for example, in a coal mine where space is at a premium and in which for example drive heads (namely, the couplings between a gear box and the driving drum of a conveyor) need to be serviced.

The sliding action which is required of the annular piston in each of the embodiments described above with reference to the drawings is facilitated by making the piston of one material (for example, cast iron or bronze) and by making the two components which define the internal chamber of steel. This is not to say that steel for both parts would not work, especially in the big sizes but it is considered to be preferable to use dissimilar metals. In general, also it is preferred to avoid the use of any lubricant on the piston because of the welding which needs to be carried out after assembly of the piston and the two chamber-forming components.

It will be evident to engineers that the invention not only can provide a connection between two components for the purpose of the transmission of motive power but also can provide a connection between two components such as will resist axial thrust; the connection could also cope with a combination of axial thrust and torque.

Some advantages which stem from the use of a coupling according to the present invention are as follows:

(1) A torque wrench, previously required for the tightening of the ring of screws, is not required. A compact high-pressure hand pump necessary to mount and dismount the coupling is not more expensive than the torque wrench but the time saved in fitting the coupling leads to considerable economies.

(2) The amount of time which can be saved is exemplified by the following:-

Tests with a locking bush for a shaft of 100 mm diameter (first component) and a second component having a bore of 145 mm diameter have given the following results:-

Time to mount=5 minutes, approx.
Time to dismount=3 minutes, approx.
Slip torque=21000 N.m. (83 U.K. ton inches).

(3) The torque capacity and/or the resistance to axial thrust can be significantly increased by degreasing the components before assembly.

(4) The ability to transmit torque and/or to resist axial thrust is not dependent on retaining oil at high pressure; the oil is drained out after use.

(5) The fine taper of the chamber and of the enclosed piston is such that the parts are infinitely self-sustaining.

(6) Whereas (with one known coupling which employs the oil-injection) dismounting can cause the outer one of the two tapered components to move axially along the coupled shafts very suddenly, with the result that people normally stand well clear of the coupled shafts, the coupling according to the present invention releases progressively and nonexplosively. When carrying out dismounting, there is a build-up of hydraulic pressure until the first movement of the annular piston takes place; this is detected by a drop in pressure at the pump and the pumping is continued at ever-decreasing pressure until the piston has been moved back to its end position.

(7) The high torque capacity and/or high resistance to axial thrust is assured (especially with degreasing as in (3) above) because the external surfaces of the coupling are not oil-wetted.

(8) The coupling is easily dismounted and easily reused.

(9) The degree of interference fit obtained by the mounted coupling can be easily monitored and precisely controlled.

(10) The coupling can be used in locations where accessibility is poor because the high-pressure hand pump can be operated from a distance via lengthy connecting hoses.

(11) Mounting of the coupling is reliable and consistent; tightening occurs evenly without skewing and without the uncertain torque-friction characteristics of screws.

(12) There is no tendency of the coupling or of the clamped component(s) to make any axial movement during mounting or dismounting.

(13) The relative angular positions of components and coupling may be adjusted infinitely and yet there is zero backlash once the coupling has been mounted.

(14) The coupling has excellent self-centering characteristics.

(15) The coupling is tamperproof.

(16) The coupling has a low susceptibility to contamination because its "sealed unit" construction (the respective mounting and dismounting tappings are, of course, plugged after use to keep out foreign bodies) requires only the use of clean mineral oil.

(17) There is improved shaft strength even though the dimensions of the shaft can be reduced; this improved strength stems from the elimination of keyways, splines, cotters and so on. Moreover, there is improved fatigue life.

(18) The elimination of heavily loaded screws gives an enormous reduction in both assembly time and effort. Moreover, operators do not have to handle heavy tooling.

(19) The coupling is capable of acting, in the last resort, as an overload protection of expensive machine components against damage and this is something that keyed components could never provide. The coupling is not, however, to be used repeatedly as a form of slipping clutch.

(20) The hydraulic coupling, being mounted so simply and quickly, lends itself to an assembly line or moving track. Thus, for example, the coupling could be used where it is necessary for a flywheel to be mounted on an engine shaft; this could be done quickly and efficiently by means of an electric pump or by means of a pump which is driven by compressed air.

(21) It must be stressed that, in order to mount/dismount a coupling according to the invention, a single source of high-pressure fluid is used; this is an advantage when compared with at least one known arrangement which employs high pressure injectors to create the necessary oil film between the respective sleeves and a low pressure pump to cause relative axial movement between said sleeves.

It is considered that the field of application is extremely wide but the following are mentioned by way of example:-

Machine tools. Drive shafts, cranks, gears and flywheels.

Marine uses. Propellers, couplings, rudder stocks.

Mining equipment. Drum endplates, crusher rotors, gearbox couplings, cutting heads, winch drums.

Process machinery. Valve stems, sprockets, levers, cams, paper machinery.

I claim:

1. A coupling for frictionally joining and locking two components for simultaneous angular and axial movement, comprising:
   first and second concentric annular members connected by liquid-tight seals;
   at least one annular chamber defined by corresponding surfaces of said annular members;
   at least one captive annular piston housed within said chamber, said chamber and said piston having matching axially extending, conically tapered surfaces;
   injection means for selectively supplying hydraulic fluid under pressure to opposite ends of said piston and selectively causing radial expansion and contraction of said chamber by axial displacement of said piston.

2. A coupling according to claim 1 wherein said annular members and said piston form a locking bush having only one annular piston, said bush including conduit and valve means for conveying liquid pressurizing one end of said piston to between said piston and said annular members and for producing a film of the liquid between contacting surfaces thereof to facilitate axial movement of said piston in said chamber.

3. A coupling according to claim 1 wherein said annular members and said piston form a frictional locking bush having only one piston, said piston including first and second nonintersecting grooves in each of axially extending, radially inwardly and outwardly facing surfaces of said piston, each of said first grooves opening at one end of said piston into said chamber, each of said second grooves opening at an opposite end of said piston into said chamber, each of said grooves having a closed end intermediate the ends of said piston;
   whereby liquid supplied to an end of said piston produces a film of the liquid between contacting surfaces of said piston and said annular members facilitating axial movement of the piston.

4. A coupling according to claim 3 wherein said nonintersecting grooves are helical.

5. A coupling according to claim 3 wherein said piston comprises a plurality of said non-intersecting grooves arranged in two sets, said grooves extending axially relative to said bush.

6. A coupling according to claim 1 wherein said annular members form a sleeve housing a single piston, said second annular member being radially outside said first annular member and having a radial thickness greater than that of said first annular member for absorbing loop stresses generated by liquid pressure.

7. A coupling according to claim 1 wherein said second annular member comprises first and second parts coupled by fastening means for forming a sleeve, each of said parts having a separate chamber housing a single annular piston and having a separate injection means for supplying hydraulic fluid under pressure to opposite sides of the respective piston to move the respective piston axially, said first part having an axially extending annular re-entrant recess, said second part having a complementary axially extending boss mating with said recess.

* * * * *